(12) United States Patent
Johnson et al.

(10) Patent No.: US 7,444,551 B1
(45) Date of Patent: Oct. 28, 2008

(54) METHOD AND APPARATUS FOR SYSTEM STATUS MONITORING, TESTING AND RESTORATION

(75) Inventors: Christopher W. Johnson, Cupertino, CA (US); Kevin J. Kranzusch, Campbell, CA (US); Andrew Sobczyk, Kent, WA (US)

(73) Assignee: NVIDIA Corporation, Santa Clara, CA (US)

( * ) Notice: Subject to any disclaimer, the term of this patent is extended or adjusted under 35 U.S.C. 154(b) by 1311 days.

(21) Appl. No.: 10/321,046

(22) Filed: Dec. 16, 2002

(51) Int. Cl.
*G06F 11/00* (2006.01)
(52) U.S. Cl. .......................... 714/43; 714/41
(58) Field of Classification Search ............. 714/43, 714/41
See application file for complete search history.

(56) References Cited

U.S. PATENT DOCUMENTS

| | | | |
|---|---|---|---|
| 5,623,692 A | 4/1997 | Priem et al. | |
| 5,659,750 A | 8/1997 | Priem et al. | |
| 5,721,947 A | 2/1998 | Priem et al. | |
| 5,887,190 A | 3/1999 | Priem et al. | |
| 5,953,351 A * | 9/1999 | Hicks et al. | ............... 714/763 |
| 6,073,193 A * | 6/2000 | Yap | ........................... 710/100 |
| 6,282,587 B1 | 8/2001 | Priem et al. | |
| 6,647,516 B1 * | 11/2003 | Rust et al. | ..................... 714/48 |
| 2002/0152425 A1 * | 10/2002 | Chaiken et al. | ............... 714/23 |

* cited by examiner

*Primary Examiner*—Emerson C Puente
(74) *Attorney, Agent, or Firm*—Patterson & Sheridan, LLP

(57) ABSTRACT

Method and apparatus for channel monitoring, channel throughput restoration and system testing in relation to channel monitoring and channel throughput restoration is described. A failure status of a channel is identified. The channel and at least one engine associated with the failure status is disabled. A client application assigned such a channel is notified that the channel has been disabled. The at least one engine and the channel associated with the failure status is restored. Additionally, the client application is allowed to destroy and reconstruct command status and state of the channel. Additionally, error information for the failure status is stored. Other aspects include: error injection which may be used for testing ability to detect an error and recover; and a graphical user interface for rendering mode selection for increasing channel throughput.

25 Claims, 10 Drawing Sheets

METHOD AND APPARATUS FOR SYSTEM STATUS MONITORING, TESTING AND RESTORATION

TECHNICAL FIELD

One or more aspects of the invention relate generally to system status monitoring, testing and restoration, and, more particularly, to fault detection and service restoration with respect to channel usage between a central processing unit and a graphics processing unit.

BACKGROUND

Anyone using a personal computer is likely to have experienced a system crash or stop error. For example, a process may not be responding, and this lack of response can cause the computer system to hang up. However, detecting and recovering from the root cause of a problem can be problematic owing to the number of possible causes.

A more recent feature in operating systems is known as "Online Crash Analysis" (OCA). When a crash event or stop error occurs during use of an operating system, a user can upload an error report to a web site for analysis. In an implementation by Microsoft Corporation of Redmond, Wash. ("Microsoft"), error reports are analyzed and prioritized, the latter of which is done by total number of affected customers for such a stop error listed in the error report. OCA was put in place by Microsoft primarily to detect crash events or stop errors in drivers provided by entities other than Microsoft. However, Microsoft conventionally requires rebooting of the computer system after a stop error. Thus, all context and state information for all active/ongoing processes may be lost. This includes both the activity causing the error, as well as non-offending processes.

Accordingly, it would be desirable and useful to provide error detection that at least enhances the ability of pending, non-offending processing to be continued or recovered, namely, that at least reduces likelihood of having to reboot. Furthermore, it would be desirable and useful to be able to at least test some types of failures to check for proper system response prior to shipping to customers.

SUMMARY

An aspect of the present invention is an application program interface for a programmed computer. A data input field is provided to receive a rendering mode type. A first command is provided to lookup a periodic callback time associated with the rendering mode type. A second command is provided to set the periodic callback time to schedule channel access to a graphics processing unit.

An aspect of the present invention is a graphical user interface for a programmed computer control panel. The control panel has a selectable system status checking switch for selecting one of enabling and disabling system status checking and has a menu of at least one selectable rendering mode type, where the at least one selectable rendering mode type is selectable responsive to selection of the enabling of the system status checking.

An aspect of the present invention is a method for error injection. A channel is selected. An error mode is selected. At least one error is injected into the channel selected, where the at least one error is for the error mode selected.

An aspect of the present invention is a method for restoring channel service. A failure status is identified. A channel and at least one engine associated with the failure status is disabled. A client application is notified that the channel has been disabled. The at least one engine and the channel associated with the failure status is restored. Additionally, for another aspect of the present invention, the client application is allowed to destroy and reconstruct command status and state of the channel.

BRIEF DESCRIPTION OF THE DRAWINGS

Accompanying drawing(s) show exemplary embodiment(s) in accordance with one or more aspects of the present invention; however, the accompanying drawing(s) should not be taken to limit the present invention to the embodiment(s) shown, but are for explanation and understanding only.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
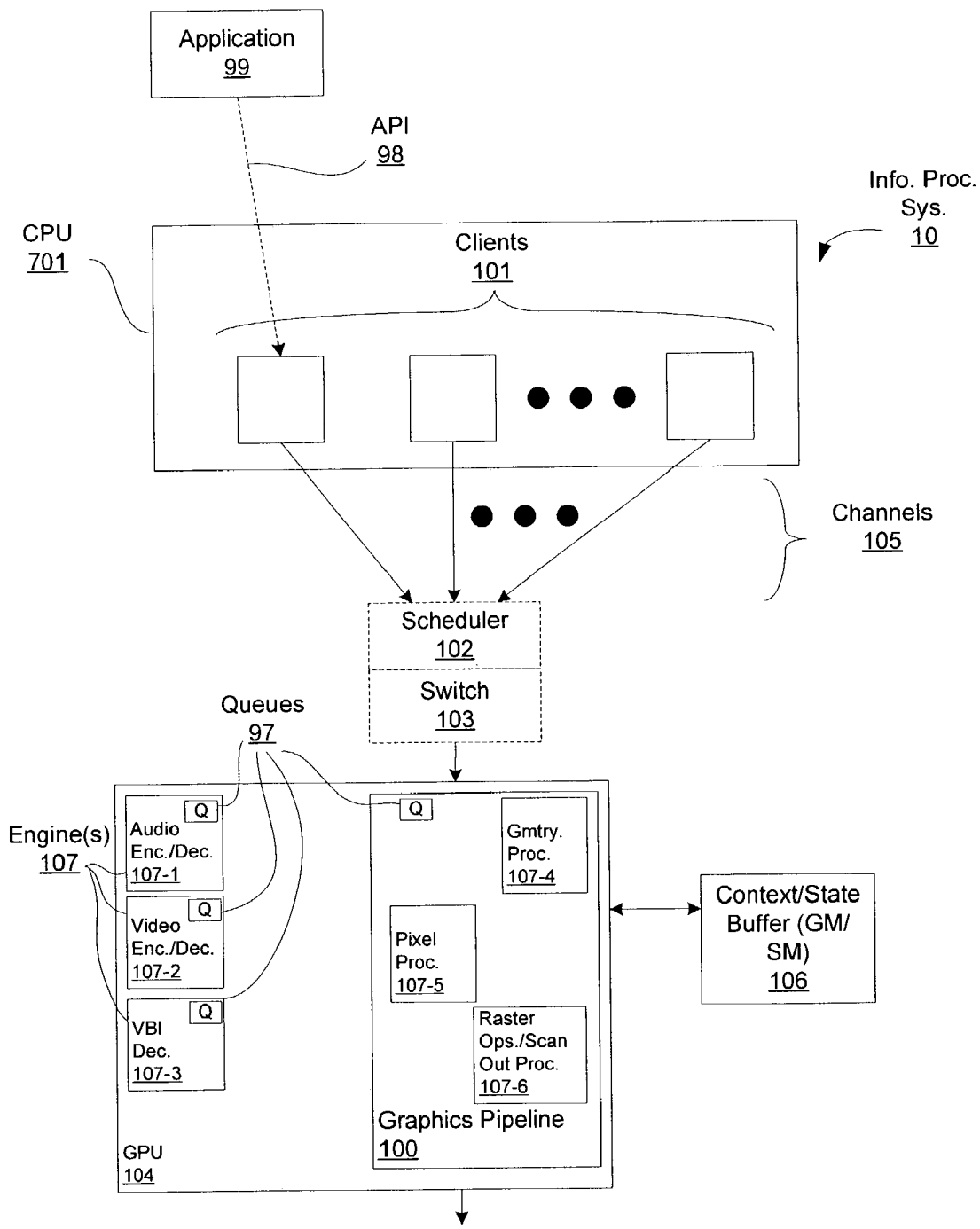
FIG. 1 depicts a high-level block diagram of an exemplary embodiment of a pipeline that may be used when implementing one or more aspects of the present invention.

FIG. 1 depicts a high-level block diagram of an exemplary embodiment of a portion of an information processing system in accordance with one or more aspects of the present invention. GPU 104, or more particularly graphics pipeline 100 or one or more graphics processors, at an instance of time may have one or more clients communicating with it via respective assigned channels 105. Clients 101 may be applications, such as device drivers, graphics applications, application program interfaces (APIs), and the like that use graphics processing capabilities. For example, a Central Processing Unit (CPU) 701 may have one or more of clients 101, where an application program 99 communicates to such a client 101 via an Application Program Interface (API). Conventionally, channels 105 are assigned respective address spaces, which are unique to each active client 101. These channels 105 are provided pipelined access to graphics processing hardware (H/W) 104, such as a stand-alone or integrated graphics processor, namely, a "Graphics Processing Unit" (GPU). Pipelined access is through scheduler 102 and switch 103. Notably, scheduler 102 and switch 103 may be implemented in software, including software or firmware or both, hardware, or a combination of hardware and software. However, for purposes of clarity scheduler 102 and switch 103 are described in terms of a software embodiment as indicated by dashed boxes, as it will be apparent in view of description that such other embodiments may be used.

Scheduler 102 may schedule access based on a time slice basis, priority interrupt basis or a combination thereof. Switch 103 is used to switch from one channel to another to provide pipelined access as scheduled. GPU 104 includes processing engines 107, as is known. All, some or one engine may be in use at a time for a client 101 with a currently active channel 105. Examples of processing engines 107, are audio encoder/decoder 107-1, video encoder/decoder 107-2, vertical blanking interval (VBI) decoder 107-3, geometry processor 107-4, pixel processor 107-5, and raster operations/scan out processor 107-6, among other known engines. Additionally, each engine 107 may have a queue 97 to stack actions.

When a next scheduled channel 105 is to be provided a scheduled access, switch 103 waits for an idle state of all engines 107 currently being used by an active client/channel, namely, a point where all active engines 107 may be idled, stopped, or a combination thereof. Context and state graphics information for a current process is stored in context or state ("context") buffer 106 in association with the currently active channel, so that switch 103 can allow access to a next scheduled channel without undoing or corrupting previous work. Each engine 107 may have its own context store 106 for independent operation. Context buffer 106, as well as queues 97, may be part of graphics memory (GM) or system memory (SM) or a combination thereof. Heretofore, if a system crashed, all information in context buffer 106 could be lost for all clients 101, for example, the one associated with an error condition causing the crash and those not causing the crash.

Figure 2:
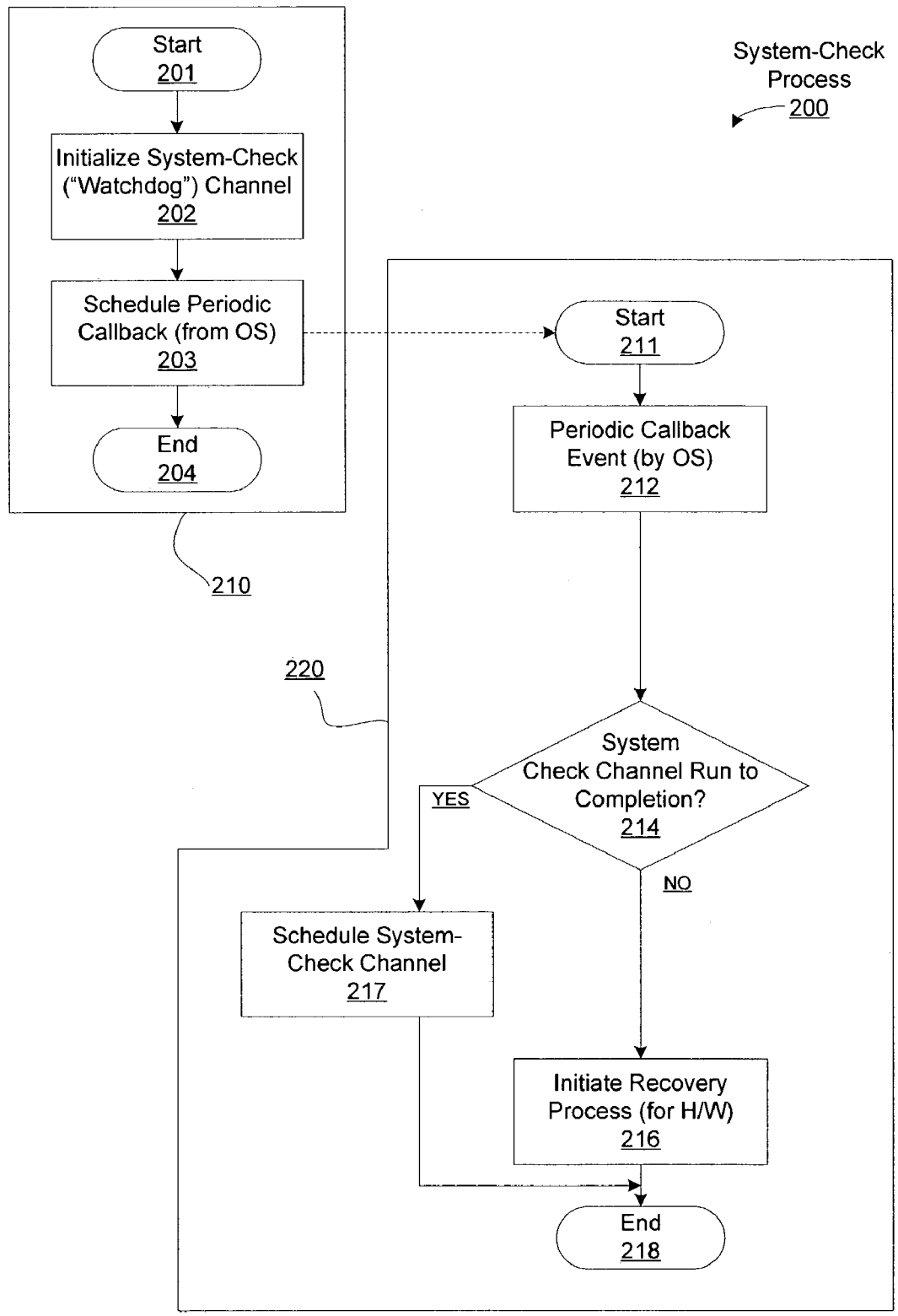
FIG. 2 depicts a flow diagram of an exemplary embodiment of a system check process in accordance with one or more aspects of the present invention.

FIG. 2 depicts a flow diagram of an exemplary embodiment of a system-check process 200 in accordance with one or more aspects of the present invention. At 201, a channel initialization-schedule portion 210 of system-check process 200 is initiated.

With continuing reference to FIG. 2 and renewed reference to FIG. 1, at 202, a channel, such as a channel 105, is initialized. This channel initialized at 202 is a system check or "watchdog" channel. At 203, a periodic callback is scheduled. A request to schedule such a periodic callback is from an operating system. This periodic callback scheduling at 203 initiates another part of system-check process 200 at 211. Channel initialization/schedule portion 210 of system-check process 200 used to schedule a periodic callback ends at 204.

At 211, check-recovery portion 220 of system-check process is initiated. At 212, a periodic callback event is received by an operating system. At 214, a check is made to determine if the previous system-check channel operation scheduled has run. This check is done in a manner consistent with scheduling this periodic event. For Windows XP, this should be less than about every 15 seconds, namely, reasonably in advance of an operating system causing a system lockout condition in response to a crash or stop event. If this is an initial iteration, then at 214 a check is made to determine if the system-check channel initiated at 202 has run to completion. If this is not an initial iteration, then at 214 the check made is to determine if a system-check channel instantiated at 217 has run to completion.

If at 214, a scheduled system check channel has run to completion, then at 217 another system-check channel operation is scheduled. After scheduling, check-recovery portion 220 of system-check process ends at 218. As this is a periodic callback, another callback is done automatically. However, alternatively, 214 could branch back to 212 to receive another callback event. It should be understood that a channel is being periodically scheduled. If a schedule channel executes, meaning is given access to one or more engines 107 of GPU 104, then another channel is scheduled X seconds later, where X is dependent on the period used. In this manner, it is possible to tell if GPU 104 is hung up on a process of a client 101, as a watchdog channel will not execute periodically. In other words, if GPU 104 is in an error or stalled state. It is possible that a process intensive rendering is being done exceeding the periodic threshold and having no apparent stopping point for switch 103 to allow another channel access. This later condition is addressed below, by allowing system-check process 200 to be disabled or to allow periodicity to be selected based on rendering mode type.

If at 214, a system-check channel has not run to completion, then at 216, a call to initiate a recovery process for an engine or engines 107 is made. After execution of a recovery process, described below, system-check process 200 ends at 218.

Figure 3:
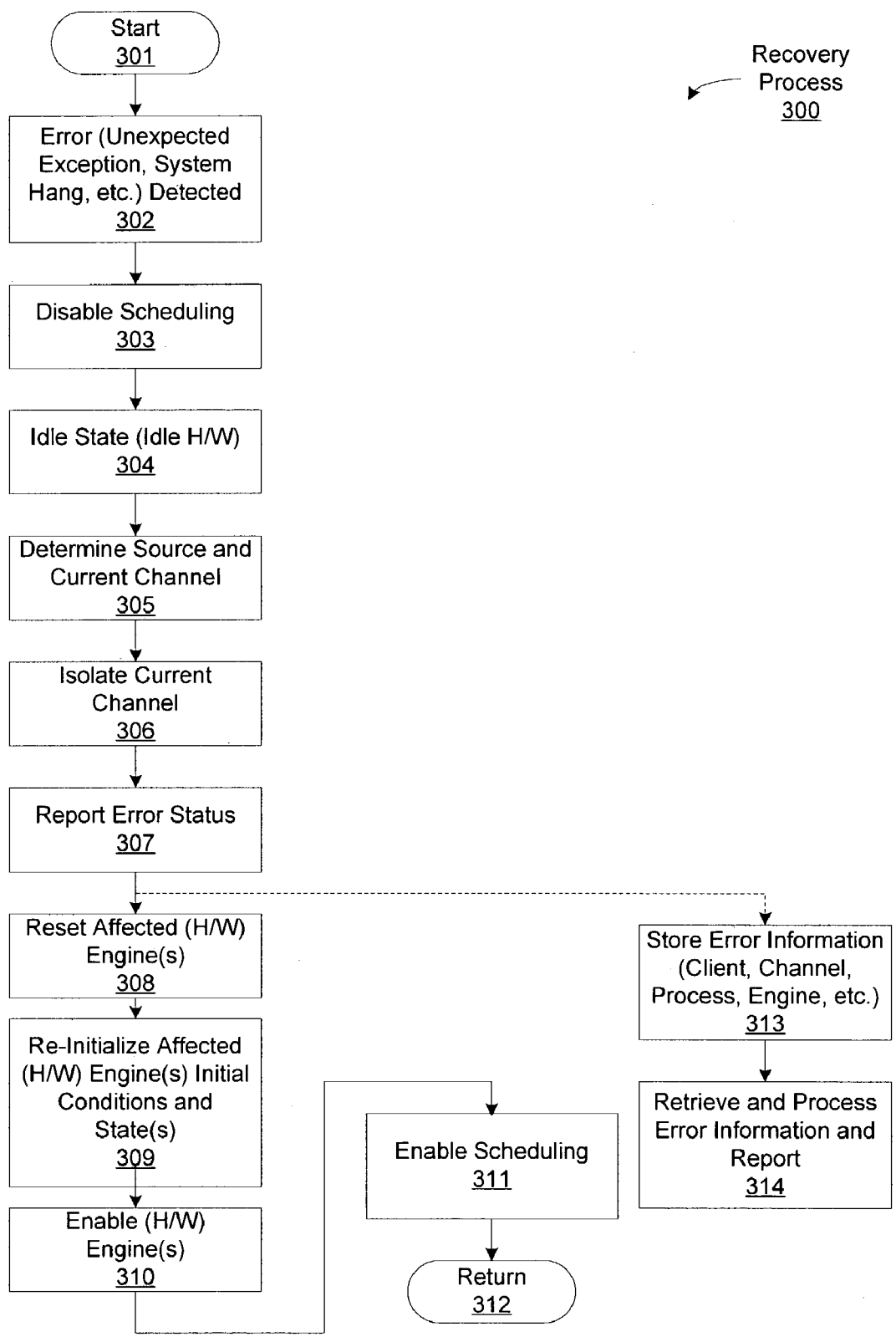
FIG. 3 depicts a flow diagram of an exemplary embodiment of a recovery process in accordance with one or more aspects of the present invention.

FIG. 3 depicts a flow diagram of an exemplary embodiment of a recovery process 300 in accordance with one or more aspects of the present invention. In response to a call at 216, recovery process 300 is initiated at 301. At 302, an error, such as an unexpected exception, system hang, and the like of one or more engines 107 of GPU 104 of FIG. 1, is detected. With continuing reference to FIG. 3 and renewed reference to FIG. 1, at 303, scheduling by scheduler 103 is disabled to temporarily hold-off any other channel from being scheduled. At 304, the one or more engines 107 affected by such an error are put in an idle state. This temporarily disables such engine or engines 107 for recovery process 300. At 305, source, such as a client 101, and channel, such as channel 105, associated with such an error is identified. Source fault and current channel of an associated error is identified by reading state explicitly from hardware, for example scheduler 102 or switch 103 contains identification—source fault and current channel—information by default, i.e., a current channel scheduled and switched on to have access to GPU 104. The channel identified at 305 is isolated at 306. This facilitates temporarily bypassing this isolated channel. At 307, a client is notified of isolation of the channel it was using. Reporting of error status 307 may optionally include reporting of client information, channel information, affected engines, affected processes, and other facts associated with occurrence and detection of an error. Such error information may optionally be stored at 313 for subsequent retrieval, statistical processing and reporting at 314. Notably, once a channel has been isolated, further activity associated with such channel during isolation is precluded from affecting engines 107 of GPU 104. So, even if a client 101 associated with such an isolated channel 105 would attempt to proceed, it cannot.

At 308, those engines 107 affected by an error condition are reset. At 309, reset affected engines 107 are re-initialized with initial condition and state information. Information for resetting at 309 is obtained from context buffer 106. Notably, at 308, when affected engines are reset, information in context buffer 106 may be purged for a process having or associated with such an error condition, and in any event is no longer considered valid.

At 310, the one or more engines 107 idled at 304 is/are enabled. At 311, scheduling disabled at 303 is enabled. So, at 311, scheduler 103 disabled at 303 is enabled at 311. At 312, recovery process 312 returns to 216 of FIG. 2 from where it was called.

Accordingly, by isolating an affected channel, a client is notified that the channel is disabled. Thus, a client associated with an error is allowed to destroy and recover command status, namely, begin anew. However, any other pending processes are allowed to continue after scheduler 103 of FIG. 1 is re-enabled at 311.

Figure 4:
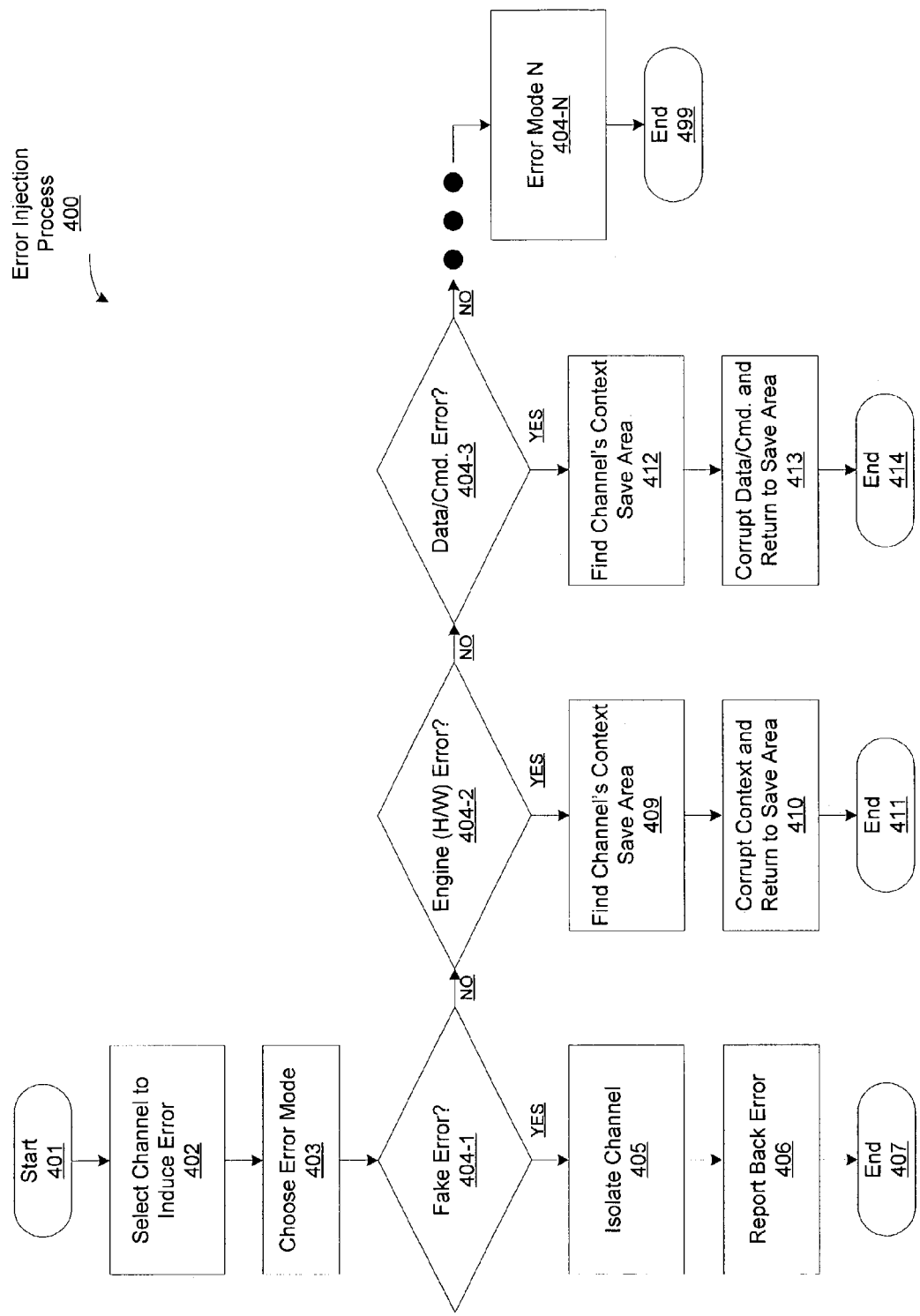
FIG. 4 depicts a flow diagram of an exemplary embodiment of an error injection process in accordance with one or more aspects of the present invention.

FIG. 4 depicts a flow diagram of an exemplary embodiment of an error injection process 400 in accordance with one or more aspects of the present invention. At 401, error injection process 400 is initiated. At 402, a channel is selected, whether randomly selected or selected in a predetermined or determined order. The intent is to induce an error for a selected channel to determine how GPU 104, or more particularly graphics pipeline 100, of FIG. 1 responds. Thus, GPU 104 may be tested in advance of shipment, particularly system-check process 200 of FIG. 2.

At 403, an error mode is selected. An error mode may be selected from a plurality of error modes, as indicated by decision blocks 404-1 to 404-2, which by elimination may end in an nth error mode 404-N followed by ending error injection process 400 at 499. Alternatively, an error mode may be looked up in a lookup table or other mode listing.

By way of example, three possible error modes, fake error, engine error and corrupting data/command(s), are illustratively shown. For purposes of clarity, fake error mode, engine error mode and command error mode are described though it will be apparent that other error modes may be added or even replace such examples.

For corrupting data/command(s) error mode, data/command(s) from a client 101 sent down to GPU 104, such as through a channel 105, of FIG. 1 are corrupted. This error mode may be used to replicate errors where client 101 has sent corrupted data/command(s) to GPU 104 of FIG. 1 or data/command(s) have been corrupted somewhere else in a system prior to reaching GPU 104. If such an error is injected, GPU 104 should detect such error and initiate recovery.

If at 404-1, it is determined that a fake error mode was selected, then at 405, a channel selected at 402 is isolated from a client associated therewith. At 406, the client is notified that its command channel is no longer available due to an error. In other words, this client is falsely informed that the channel has been disabled. From inducing this fake error, it may be determine how error recovery process 300 of FIG. 3 responds. At 407, error injection process 400 ends for this mode. Alternatively, error injection process may have a query to determine if another error mode is to be selected such that a plurality of errors may be injected for test purposes.

If at 404-1 it is determined that a fake error mode was not selected, and if at 404-2 it is determined that a hardware error, such as an engine error, mode is selected, then at 409 a context for a channel selected at 402 is obtained. Such context may be obtained from a save area in context buffer 106 of FIG. 1. At 410, context obtained at 409 is corrupted. Further at 410, corrupted context is returned to such save area to inject an error condition. At 411, error injection process 400 ends for this mode. In other words, a client associated with a selected channel has a corrupted context. By inducing this corruption, it may be determine how error recovery process 300 of FIG. 3 responds when such a corrupted context is loaded for subsequent processing by one or more engines 107 in GPU 104 of FIG. 1.

If at 404-3 it is determined that a data/command error mode is selected, then at 412, stored data/command information for a channel selected at 402 is obtained. Such stored data/command information may be obtained from a save area in context buffer 106 of FIG. 1. At 413, data/command information obtained at 412 is corrupted. Further at 413, such corrupted data/command information is returned to such save area to inject an error condition. At 414, error injection process 400 ends for this mode. By inducing this corruption, it may be determine how error recovery process 300 of FIG. 3 responds when such corrupted data/command information is loaded for subsequent processing by one or more engines 107 in GPU 104 of FIG. 1.

Figure 5:
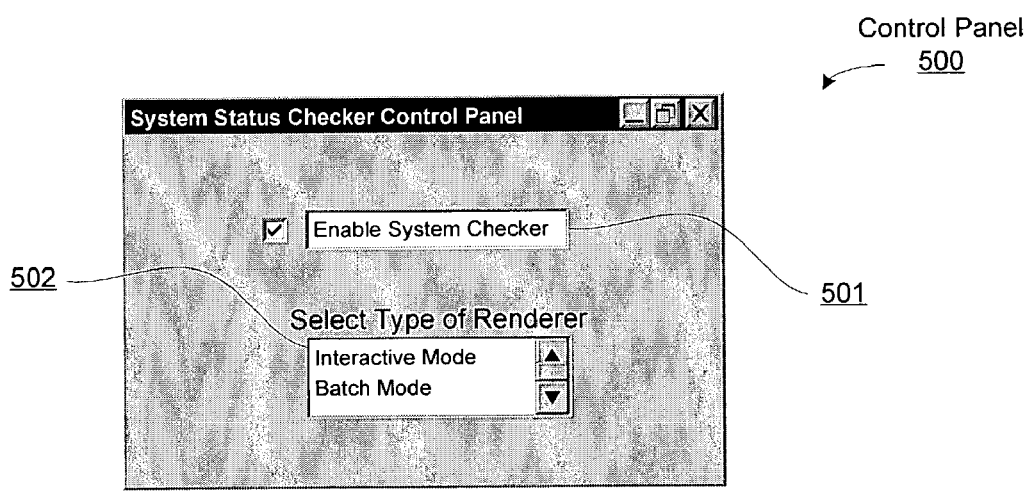
FIG. 5 depicts a pictorial diagram of an exemplary embodiment of a control panel graphic user interface (GUI) in accordance with one or more aspects of the present invention.

FIG. 5 is a pictorial diagram of an exemplary embodiment of a control panel graphic user interface (GUI) 500 in accordance with one or more aspects of the present invention. Control panel GUI 500 includes a command selection window 501 for selecting whether to either enable or disable system-check processing, such as whether to either enable or disable system-check process 200 of FIG. 2. This may be particularly advantageous for process intensive rendering, where time needed to complete a task can prevent a periodic callback to not meet a threshold time for channel access.

Control panel GUI 500 includes a list of types of renderers 502 from which to select. In other words, rendering mode types are listed, and may be selected. A threshold time for checking on availability of channel access may be selected in response to a selected rendering mode type. Examples of renderer types include interactive mode and batch mode.

Figure 6:
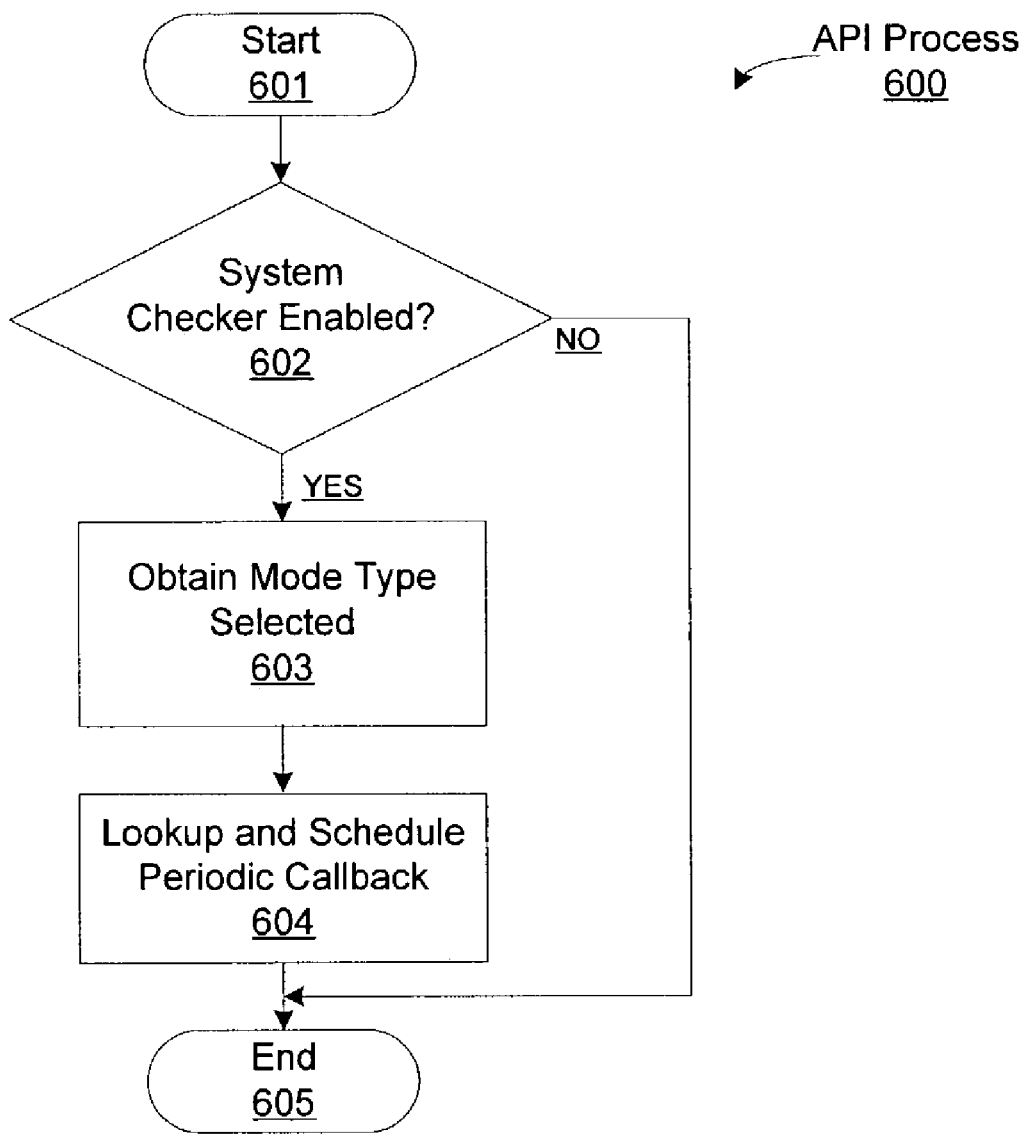
FIG. 6 depicts a flow diagram of an exemplary embodiment of an application program interface (API) process in accordance with one or more aspects of the present invention.

FIG. 6 depicts a flow diagram of an exemplary embodiment of an application program interface (API) process ("interface process") 600 in accordance with one or more aspects of the present invention. At 601, interface process 600 is initiated. At 602, a check is made to determine whether a system checker is enabled, such a system-check process 200 of FIG. 2. If no system checker is enabled, interface process 600 ends at 605. If, however, a system checker is enabled as determined at 602, at 603 a rendering mode type is obtained, such as that selected by a user from a list of types of renderers 502 of FIG. 5. At 604, a threshold time for channel access is found, such as by being looked-up in a lookup table, in response to a rendering mode type obtained at 603. Further at 604, a periodic callback is scheduled, such as described with respect to system-check process 200 of FIG. 2. A period for such a periodic callback is found responsive to a rendering mode type. Alternatively, a default value may be used for a period if no rendering mode type is selected.

Figure 7:
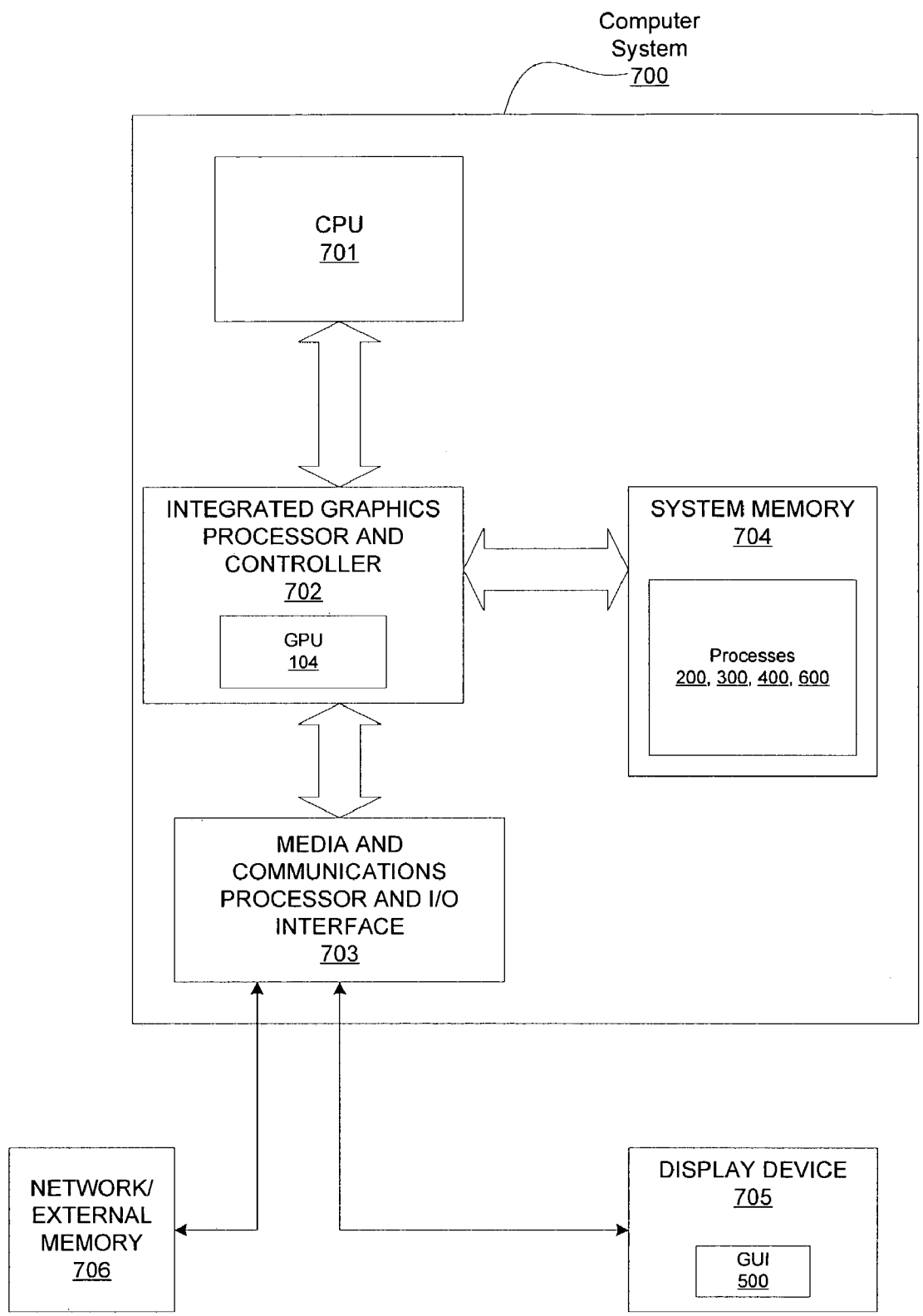
FIGS. 7-10 depict block diagrams of exemplary embodiments of computer systems in which one or more aspects of the present invention may be implemented.

FIG. 7 depicts a block diagram of an exemplary embodiment of a computer system 700 in which one or more aspects of the present invention may be implemented. Computer system 700 includes central processing unit 701, integrated graphics processor and controller 702, system memory 704 and media and communications processor and input/output interface 703.

With continuing reference to FIG. 7 and renewed reference to FIGS. 1 through 6, computer system 700 may be programmed with all or a portion of one or more of process 200, 300, 400 and 600. Computer system 700 may include or be coupled to at least one display device 705, such as for displaying control panel GUI 500. Integrated graphics processor and controller 702 may include GPU 104.

Computer system 700 may be implemented using configured personal computers, workstation computers, mini computers, mainframe computers, or a distributed network of computers. For purposes of clarity, a personal computer system 700 is described though other computer systems may be used. In addition to display device 705, other input and/or output devices such as keyboards, displays, cursor pointing devices, and the like may be used with computer system 700. Computer system 700 is programmed with an operating system, which may be one or more of OS/2, Java Virtual Machine, Linux, Solaris, Unix, Windows, Windows95, Windows98, Windows NT, and Windows2000, WindowsME, and WindowsXP, among other known platforms. At least a portion of such an operating system may be disposed in system memory 704. System memory 700 may include one or more of the following random access memory, read only memory, magneto-resistive read/write memory, optical read/write memory, cache memory, magnetic read/write memory, and the like. Additional memory, such as network/external memory 706, may be connected to computer system 700.

One or more embodiments that include one or more aspects of the present invention are program products that may reside in whole or in part in computer system 700, such as in system memory 704 or network/external memory 706. As mentioned above, memory may comprise volatile and/or non-volatile memory, including but not limited to magnetically readable memory (e.g., floppy disk, hard disk, and the like), optically readable memory (e.g., CD-ROM, -RW, DVD-ROM, -RAM, and the like), and electrically readable memory (e.g., DRAM, SRAM, EEPROM, registers, latches, and the like). Accordingly, some embodiments including one or more aspects of the present invention are program products containing machine-readable programs. The program(s) of the program product defines functions of the embodiments and can be contained on a variety of signal/bearing media, which include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments that include one or more aspects of the present invention.

Figure 8:
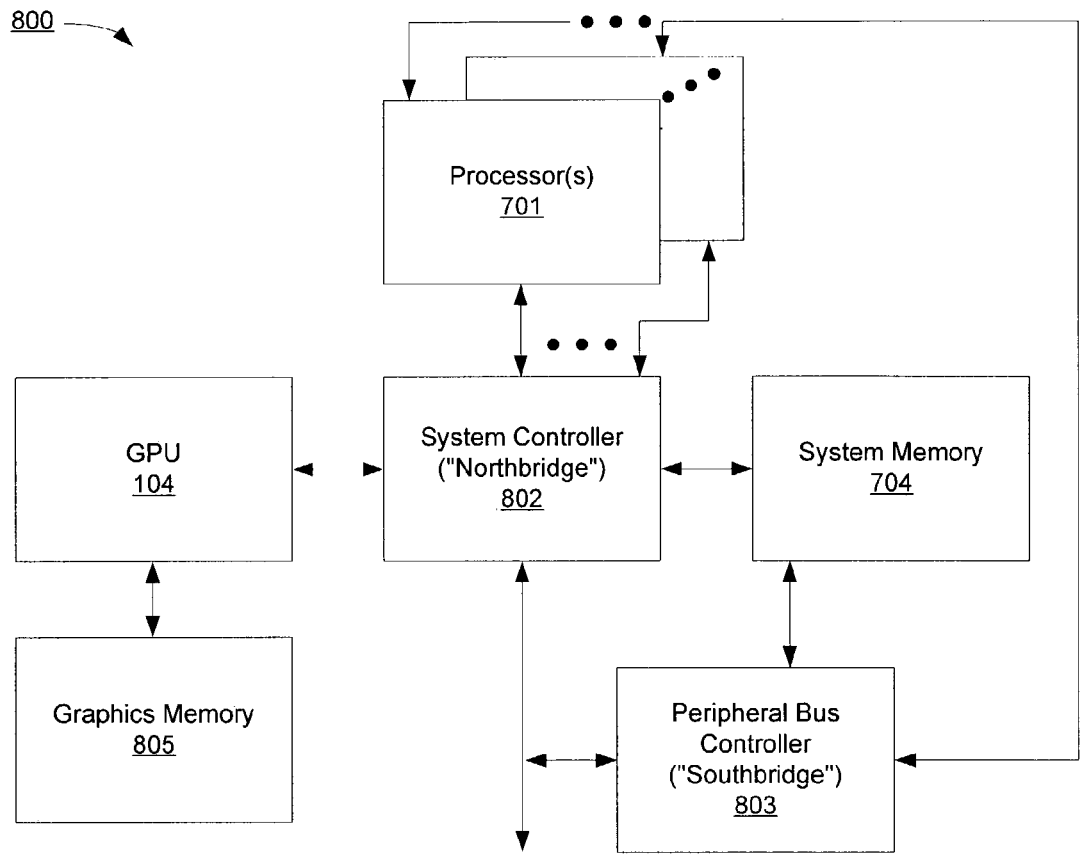

FIG. 8 depicts a block diagram of an exemplary embodiment of a computer system 800 in which one or more aspects of the present invention may be implemented. Computer system 800 comprises one or more processor(s) 701, system controller 802, GPU 104, system memory 704, and peripheral bus controller 803. Optionally, graphics memory 805 is coupled to GPU 104. GPU 104 is coupled to system controller 802, which is coupled to processor(s) 701 and system memory 704. In this manner, GPU 104 is coupled to system memory 704 via system controller 802 for shared graphics/system memory. Peripheral bus controller 803 is coupled to system controller 802 and system memory 704, as well as coupled to processor(s) 701. Accordingly, computer system 800 may be a form of a Northbridge/Southbridge architecture, also known as an Advanced Micro Devices System Controller architecture.

Figure 9:
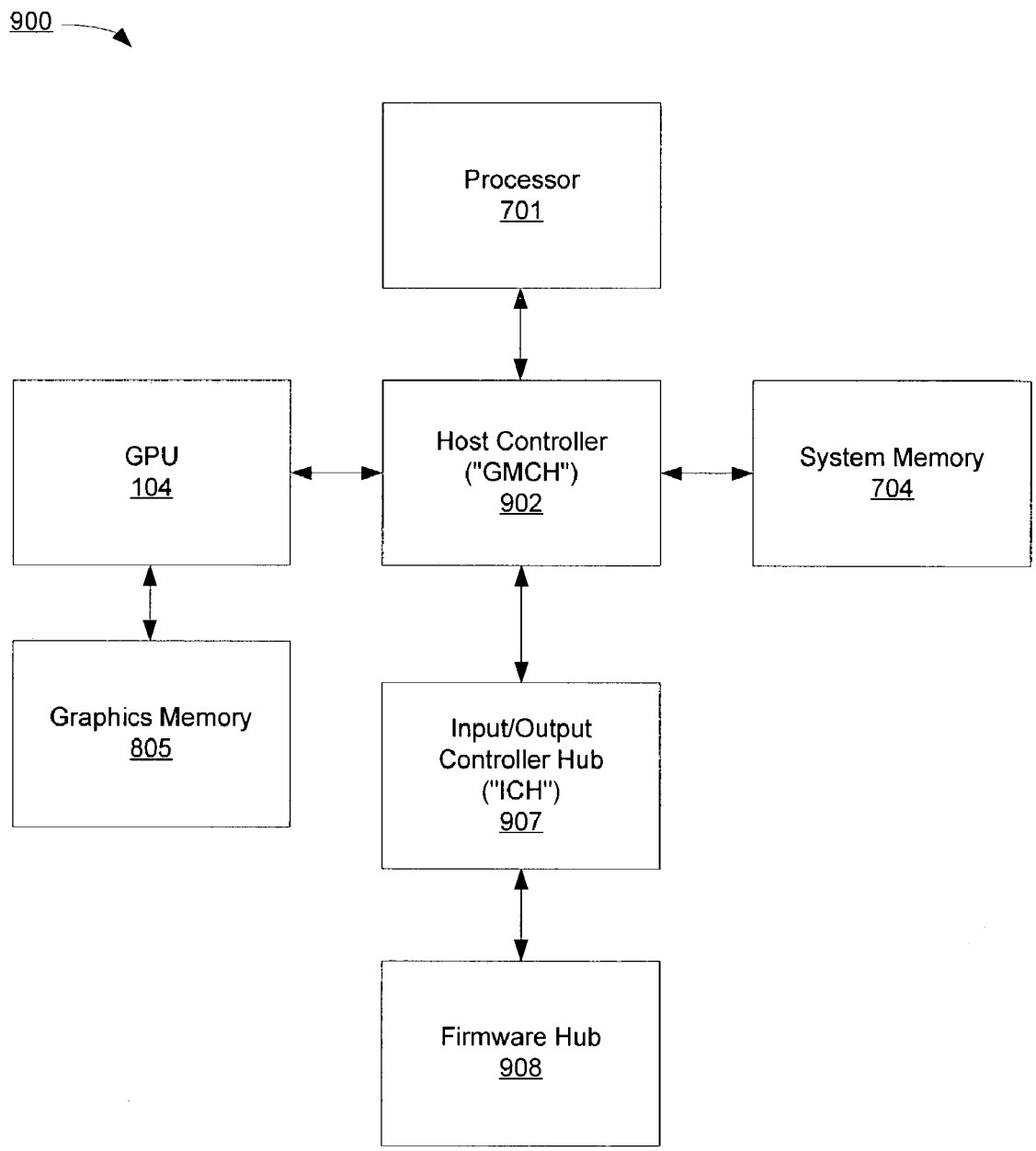

FIG. 9 depicts a block diagram of an exemplary embodiment of a computer system 900 in which one or more aspects of the present invention may be implemented. Computer system 900 comprises processor 701, host controller 902, GPU 104, system memory 704, input/output (I/O) controller hub 907 and firmware hub 908 (FWH). Optionally, graphics memory 805 is coupled to GPU 104. GPU 104 is coupled to host controller 902, which is coupled to processor 701, system memory 704 and input/output controller hub 907. In this manner, GPU 104 is coupled to system memory 704 via host controller 902 for shared graphics/system memory. Input/output controller hub 907 is coupled to firmware hub 908. Accordingly, computer system 900 may be a hub architecture, also known as an Intel hub architecture (IHA), where host controller 902 is a graphics memory controller hub ("GMCH") and I/O controller hub ("ICH") 907.

Figure 10:
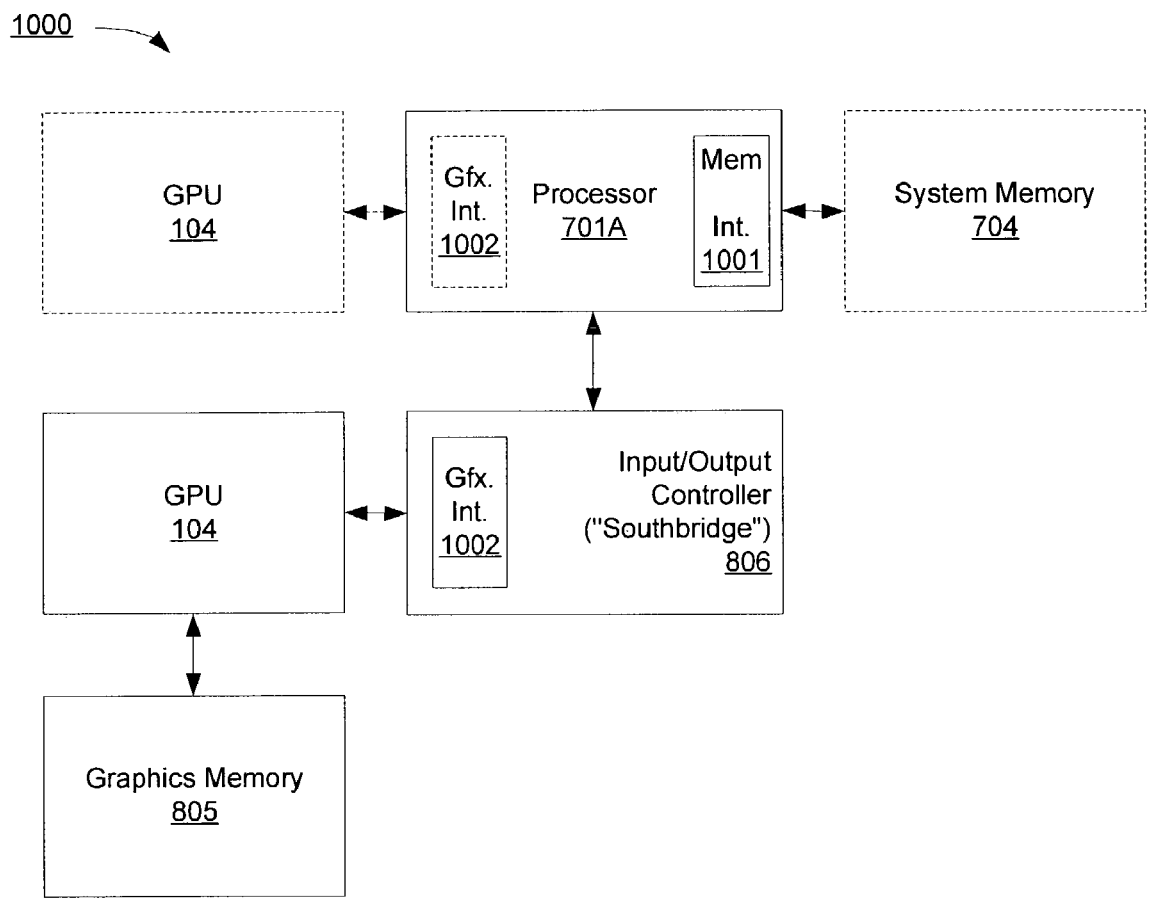

FIG. 10 depicts a block diagram of an exemplary embodiment of a computer system 1000 in which one or more aspects of the present invention may be implemented. Computer system 1000 comprises processors 701A, input/output controller 806, GPU 104, and system memory 704. Optionally, graphics memory 805 is coupled to GPU 104. Accordingly, computer system 1000 is an architecture where Northbridge functionality has been incorporated into processor 701A, such as one or more of memory interface 1001 and graphics interface 1002. Thus, GPU 104 may be coupled processor 701A via input/output controller 806 including graphics interface 1002, or, if graphics interface 1002 is part of processor 701A, GPU 104 may be directly coupled to processor 701A using graphics interface 1002. System memory 704 may be directly coupled processor 701A via memory interface 1001.

While the foregoing describes exemplary embodiment(s) in accordance with one or more aspects of the present invention, other and further embodiment(s) in accordance with the one or more aspects of the present invention may be devised without departing from the scope thereof, which is determined by the claim(s) that follow and equivalents thereof. For example, although integrated GPU/controller, Northbridge/Southbridge, Intel Hub Architecture, and CPU memory interface architectures are described, other known architectures may be used. Furthermore, though a GPU is described, other known types of integrated circuits having pipelined channel or allocated address space access may be used. It should further be understood that rapidity in fault detection by channel monitoring and testing enhances fault tolerance. Claim(s) listing steps do not imply any order of the steps. All trademarks are the property of their respective owners.

The invention claimed is:

1. A method for restoring channel service, comprising:
scheduling a plurality of channels to provide controlled access from client applications to a graphics processing unit;
identifying a failure status;
disabling a channel of the plurality of channels associated with the failure status;
disabling at least one engine of the graphics processing unit associated with the failure status;
notifying a client application that the channel has been disabled;
restoring the at least one engine associated with the failure status; and
restoring the channel associated with the failure status.

2. The method of claim 1, further comprising disabling scheduling of the plurality of channels, wherein the channel disabled is one of the plurality of channels with disabled scheduling.

3. The method of claim 2, wherein the step of disabling the at least one engine comprises idling the at least one engine.

4. The method of claim 3, wherein the step of disabling the channel comprises identifying the client application and the channel associated with the failure status.

5. The method of claim 4, wherein the step of disabling the channel comprises isolating the channel associated with the failure status.

6. The method of claim 5, wherein the step of restoring the at least one engine comprises resetting the at least one engine.

7. The method of claim 6, wherein the step of restoring the at least one engine comprises re-initializing the at least one engine with initial condition and state information.

8. The method of claim 7, wherein the step of restoring the at least one engine comprises obtaining the initial condition and state information from a context/state buffer for the at least one engine.

9. The method of claim 8, wherein the step of restoring the at least one engine comprises re-enabling the at least one engine.

10. The method of claim 9, wherein the step of restoring the channel comprises re-enabling scheduling of the plurality of channels.

11. The method of claim 10, further comprising allowing the client application to destroy and reconstruct command status and state of the channel.

12. A method for restoring channel service, comprising:
scheduling a plurality of channels to provide controlled access from client applications to a graphics processing unit;
identifying a failure status of one of the plurality of channels;
disabling the channel associated with the failure status;
disabling engines of the graphics processing unit associated with the failure status;
notifying a client application assigned with the channel that the channel has been disabled;
restoring the engines associated with the failure status;
restoring the channel associated with the failure status;
allowing the client application to destroy and reconstruct command status and state of the channel; and
storing error information for the failure status.

13. The method according to claim 12, further comprising tracking the error information stored over time for statistical evaluation.

14. The method of claim 13, wherein the step of disabling the channel comprises disabling scheduling of the plurality of channels.

15. The method of claim 14, wherein the step of disabling the engines comprises idling the engines.

16. The method of claim 15, wherein the step of disabling the channel comprises isolating the channel.

17. The method of claim 16, wherein the step of restoring the engines comprises resetting the engines.

18. The method of claim 17, wherein the step of restoring the engines comprises re-initializing the engines with initial condition and state information.

19. The method of claim 18, wherein the step of restoring the engines comprises obtaining the initial condition and state information from a context/state buffer for the engines.

20. The method of claim 19, wherein the step of restoring the engines comprises re-enabling the engines.

21. The method of claim 20, wherein the step of restoring the channel comprises re-enabling scheduling of the plurality of channels.

22. The method of claim 21, further comprising allowing the client application to destroy and reconstruct command status and state of the channel.

23. An apparatus for restoring channel throughput, comprising:
means for scheduling a plurality of channels to provide controlled access from client applications to a graphics processing unit;
means for identifying a failure status;
means for disabling a channel of the plurality of channels associated with the failure status;
means for disabling at least one engine of the graphics processing unit associated with the failure status;
means for notifying a client application that the channel has been disabled;
means for restoring the at least one engine associated with the failure status; and
means for restoring the channel associated with the failure status.

24. A storage media containing a machine-readable program, which when executed by a processor, executes a method for restoring channel throughput, the method comprising:
scheduling a plurality of channels to provide controlled access from client applications to a graphics processing unit;
identifying a failure status;
disabling a channel of the plurality of channels associated with the failure status;
disabling at least one engine of the graphics processing unit associated with the failure status;
notifying a client application that the channel has been disabled;
restoring the at least one engine associated with the failure status; and
restoring the channel associated with the failure status.

25. A programmed computer, comprising:
a central processing unit;
a graphics processing unit coupled to the central processing unit, the graphics processing unit capable of receiving information over a plurality of channels, the graphics processing unit coupled to allow receipt of data and commands from client applications via the plurality of channels;
a scheduler and a switch configured to provide controlled access from the client applications via the plurality of channels to the graphics processor unit;
memory coupled to the graphics processing unit and the central processing unit;
a program at least a portion of which is instantiated in the memory, the software configured to:
identify a failure status;
disable a channel of the plurality of channels associated with the failure status;
disable at least one engine of the graphics processing unit associated with the failure status;
notify a client application that the channel has been disabled;
restore the at least one engine; and
restore the channel.

* * * * *